(12) United States Patent
Cantin et al.

(10) Patent No.: US 8,767,215 B2
(45) Date of Patent: Jul. 1, 2014

(54) METHOD FOR DETECTING OBJECTS WITH LIGHT

(71) Applicant: Leddartech Inc., Quebec (CA)

(72) Inventors: Daniel Cantin, Quebec (CA); Pascal Gallant, Quebec (CA); François Babin, Quebec (CA); Yvan Mimeault, Quebec (CA)

(73) Assignee: Leddartech Inc., Quebec (CA)

( * ) Notice: Subject to any disclaimer, the term of this patent is extended or adjusted under 35 U.S.C. 154(b) by 0 days.

(21) Appl. No.: 13/676,875

(22) Filed: Nov. 14, 2012

(65) Prior Publication Data

US 2013/0314711 A1     Nov. 28, 2013

Related U.S. Application Data

(63) Continuation-in-part of application No. 12/141,282, filed on Jun. 18, 2008, now Pat. No. 8,319,949.

(60) Provisional application No. 60/944,649, filed on Jun. 18, 2007.

(51) Int. Cl.
G01N 21/55          (2014.01)
(52) U.S. Cl.
USPC ............................................ 356/445; 356/447
(58) Field of Classification Search
USPC ......... 356/445–448, 4.01–5.15, 141.2, 141.5, 356/3.01–3.15, 6–22, 139.1
See application file for complete search history.

(56) References Cited

U.S. PATENT DOCUMENTS

| 5,629,704 | A | | 5/1997 | Throngnumchai et al. |
| 5,836,583 | A | | 11/1998 | Towers |
| 5,889,583 | A | | 3/1999 | Dunne |
| 5,949,531 | A | | 9/1999 | Ehbets et al. |
| 5,998,925 | A | | 12/1999 | Shimizu et al. |
| 6,028,694 | A | | 2/2000 | Schmidt |
| 6,043,868 | A | * | 3/2000 | Dunne .................... 356/5.01 |
| 7,267,787 | B2 | | 9/2007 | Dong et al. |
| 7,609,387 | B2 | * | 10/2009 | Meier ...................... 356/498 |
| 2007/0228262 | A1 | | 10/2007 | Cantin et al. |
| 2008/0144000 | A1 | * | 6/2008 | Thun et al. ............... 356/5.05 |

OTHER PUBLICATIONS

T. Miyata et al., "Temporal emission characteristics of white light emitting diodes for high speed pulsed current", , (proc. of the SPIE, vol. 4829, pp. 718 719, 2003.
M. Dyble et al., "Impact of dimming white LEDs: Chromaticity shifts due to different dimming methods", proc. of the SPIE, vol. 5941, paper 59411H, 2005.

* cited by examiner

*Primary Examiner* — Tri T Ton
(74) *Attorney, Agent, or Firm* — Norton Rose Fulbright Canada LLP

(57)          ABSTRACT

A method for detecting an object using light comprises providing a light source having a function of illuminating an environment. The light source is driven to emit light in a predetermined mode, with light in the predetermined mode being emitted such that the light source maintains said function of illuminating an environment. A reflection/backscatter of the emitted light is received from an object. The reflection/backscatter is filtered over a selected wavelength range as a function of a desired range of detection from the light source to obtain a light input. The presence or position of the object is identified with the desired range of detection as a function of the light input and of the predetermined mode.

10 Claims, 7 Drawing Sheets

METHOD FOR DETECTING OBJECTS WITH LIGHT

CROSS-REFERENCE TO RELATED APPLICATION

This patent application is a continuation-in-part of U.S. patent application Ser. No. 12/141,282, filed on Jun. 18, 2008, which claims priority on United States Provisional Patent Application No. 60/944,649, filed on Jun. 18, 2007.

FIELD OF THE APPLICATION

The present application relates to a method and an apparatus implementing such a method that enable the use of a solid-state light source in a lighting system that performs its intended lighting function in addition to a lidar function for optical detection and ranging of remote obstacles or aimed targets.

BACKGROUND OF THE APPLICATION

Light-emitting diodes (LEDs) are at the heart of solid-state lighting devices, which are gaining acceptance for use in a wide range of applications from traffic lights to large flat-panel displays. Several types of high power LEDs are available with different wavelength emission, from infrared to ultraviolet. Until now, the most common LED-based source of white light has been the so-called phosphor-converted LED (pcLED). A pcLED typically consists of a LED made from a single chip of a III-V semiconductor material such as indium gallium nitride (InGaN), and emitting light in a narrow wavelength range from about 450 nanometers (nm) to 470 nm. The light radiated in this wavelength range is perceived to have a blue color. A part of the blue light emitted by the LED is absorbed by a special material such as cerium-doped yttrium-aluminum-garnet ($(Y_{1-a}Gd_a)_3(Al_{1-b}Ga_b)_5O_{12}$:$Ce^{3+}$), abbreviated as YAG:Ce. This special material is usually known as a phosphor, and it is embedded in an encapsulant transparent resin that surrounds the blue-emitting LED.

The phosphor causes down-conversion of the absorbed blue photons through a photoluminescence process to yield a light emission characterized by a broad spectrum that peaks around the 550-nm wavelength. This light is perceived to have a yellowish color. The portion of the blue light that is not absorbed by the YAG:Ce phosphor escapes to the outside and mixes with the yellow luminescent emission to generate white light. FIG. 1 shows a typical spectrum of the white light emission from a pcLED. The figure has been taken from U.S. Pat. No. 5,998,925 to Shimizu et al. The spectrum clearly shows the relatively narrowband intrinsic emission of the blue-emitting LED that peaks around the 450-nm wavelength and the broad luminescent emission that spans from about 500 nm to 700 nm.

As mentioned in U.S. Pat. No. 7,267,787 to Dong et al., the correlated color temperature of the overall white light emission from pcLEDs varies typically from 6000 K to 8000 K (cool white), while the color rendering index (CRI) of these light sources is in the range of 70 to 75. A CRI in this range results in a poor rendering of many colors, which often manifests as a lack of both deep green and red colors. The poor color rendering of white pcLEDs limited their use to some specific applications such as in flashlights, solar-powered lighting, and as light sources for energy-efficient backlighting for liquid-crystal televisions and computer displays. Owing to the ongoing advances in the development of high-brightness white LEDs, these devices are expected to take a larger part of high-power illumination systems. Examples of such illumination systems and their uses include streetlights, headlamps of car vehicles, domestic lighting, illumination for commercial buildings, and directed-area lighting for architectural purposes. LEDs are becoming more and more efficient at converting electrical power into light at a relatively low cost, and this makes them natural choices as energy efficient alternatives to standard lighting devices.

Semiconductor laser diodes, and more recently LEDs, have been used as light sources in lidar (LIght Detection And Ranging) systems, also commonly referred to simply as lidars. In addition to their traditional uses in remote-sensing applications and optical sounding of the atmosphere, lidars now find their way into various applications that range from level sensing of the top surface of liquids and materials stored in containers to adaptive cruise control (ACC) and collision-avoidance systems for car vehicles. The ever-growing optical power that can be radiated from LEDs at a relatively low cost makes them promising candidates as light sources in cost-effective lidars.

It could be very advantageous for several practical applications to combine into a single apparatus a conventional lighting system and a lidar instrument for optical detection and ranging at close to medium range. For example, significant reductions in the hardware complexity and manufacturing cost of ACC and collision-avoidance systems for car vehicles could be obtained by using the light emitted from a lighting system (here the car headlamps) already present in vehicles to perform the forward-looking optical detection and ranging (lidar) function required in the operation of these systems. Both lighting and lidar functions could be implemented by using a single light source like an assembly of white pcLEDs mounted in a car headlamp, and integrating proper drive electronics and data/signal processing means. The assembly of LEDs could then be driven and commanded to perform a lidar function in a transparent fashion, i.e., without affecting the primary lighting function of the car headlamps.

SUMMARY OF APPLICATION

It is an object of the present application to provide a method that addresses issues associated with the prior art.

It is another object of the present application is to provide a method for driving a light source with current waveforms that combine a pulse-width-modulation (PWM) scheme of variable duty cycle intended for standard illumination purposes with a train of short-duration current pulses to enable optical ranging of remote targets or obstacles with good distance resolution and accuracy.

Therefore, in accordance with an embodiment of the present disclosure, there is provided a method for detecting an object using light, comprising: obtaining a light source having a function of illuminating an environment; driving the light source to emit light in a pulse-width modulation, such that the light source maintains said function of illuminating an environment; receiving a reflection/backscatter of the emitted light from an object; identifying rapid transients in the reflection/backscatter received; and calculating a distance of the object from the rapid transients received and rapid transients from the pulse-width modulation.

According to one embodiment, the present application relates to a method that enables the use of a broadband solid-state light source formed of an assembly of at least one pcLED in a dual-function lighting apparatus that can perform its intended lighting function in addition to a lidar function that serves for optical detection of remote obstacles or aimed targets and measurement of their distance relative to the apparatus.

In an attempt at using white pcLEDs in an apparatus that must perform a lidar function, a great deal of attention must be focused on the ability of these solid-state light sources to radiate light in the form of pulses of very short duration, i.e., having a duration that does not exceed a few tens of ns. Unfortunately, the overall emission from a white pcLED has a relatively long decay lifetime when the LED is driven with current pulses having duration of only a few ns. By contrast, the risetime of the response of white pcLEDs is very fast, since it is typically on the order of 10 ns. White pcLEDs are based on a blue-emitting LED junction that excites a phosphor that surrounds it. The luminescent emission from the phosphor combines with the blue emission from the LED to generate white light. The decay of the luminescent emission is much slower than the intrinsic decay of the blue emission from the LED.

The resolution of distance measurements performed with a lidar, namely the ability to discriminate between the responses associated with two targets located at close distance from each other, degrades with an increase of the overall duration of the light pulses emitted by the lidar. The duration of the lidar pulses depends critically on the transient response of the light source, and particularly on the pulse decay lifetime when pcLEDs act as the light source for the lidar. Furthermore, the precise temporal profile of the pulsed light signal reflected off a remote target will vary with the dominant color of the target if the emitted optical pulses have a decay lifetime that varies over their wavelength spectrum. As a consequence, with a light source made up of white pcLEDs a target having a dominant blue color will reflect a return signal of shorter duration as compared to a similar target but having a yellow or red dominant color. The sensitivity of the temporal shape of the return optical signals to the color of the target will make difficult the calibration of the lidar to correlate accurately the target distances with the timing signals. The method of the present invention solves this difficulty in an efficient manner by performing the optical detection of the returned light signals over two separate wavelength bands using appropriate optical filter means. One of these detection wavelength bands is centered on the blue emission from white pcLEDs to benefit from the faster decay lifetime of the blue emission when performing optical ranging of targets or obstacles located at close range. The second detection wavelength band coincides with a portion of the broadband luminescent emission from white pcLEDs to take advantage of the higher energy per pulse of this emission when performing optical ranging of targets or obstacles located at long range.

The emission of ns-duration short optical pulses is combined with the emission of illumination light according to a pulse-width modulation scheme to allow the apparatus to perform its lidar function without any significant impact on its lighting function. This modulation scheme is an efficient way to control the intensity (dimming) of the illumination light via changes in the duty cycle of the modulation.

These and other objects, advantages and novel features of the invention will be further appreciated by reference to the detailed description of the preferred embodiments in conjunction with the accompanying drawings.

Throughout this specification, the term "lighting system" is intended to include a light source that emits visible light (i.e., emitted at wavelengths which are visible to the human eye) or invisible light (referring to light emitted at wavelengths which are not visible to the human eye).

Throughout this specification, the term "object" is intended to include a moving object and a stationary object. For example, it can be a vehicle (a car, truck, bus, motorcycle, bicycle, etc), a person (pedestrian, passenger, etc), an animal, fixed object (pavement, wall, post, sidewalk, ground surface, tree, etc), an environmental particle (fog, rain, snow, smoke, gas, smog, dust, etc), etc.

DESCRIPTION OF THE PREFERRED EMBODIMENTS

Figure 1:
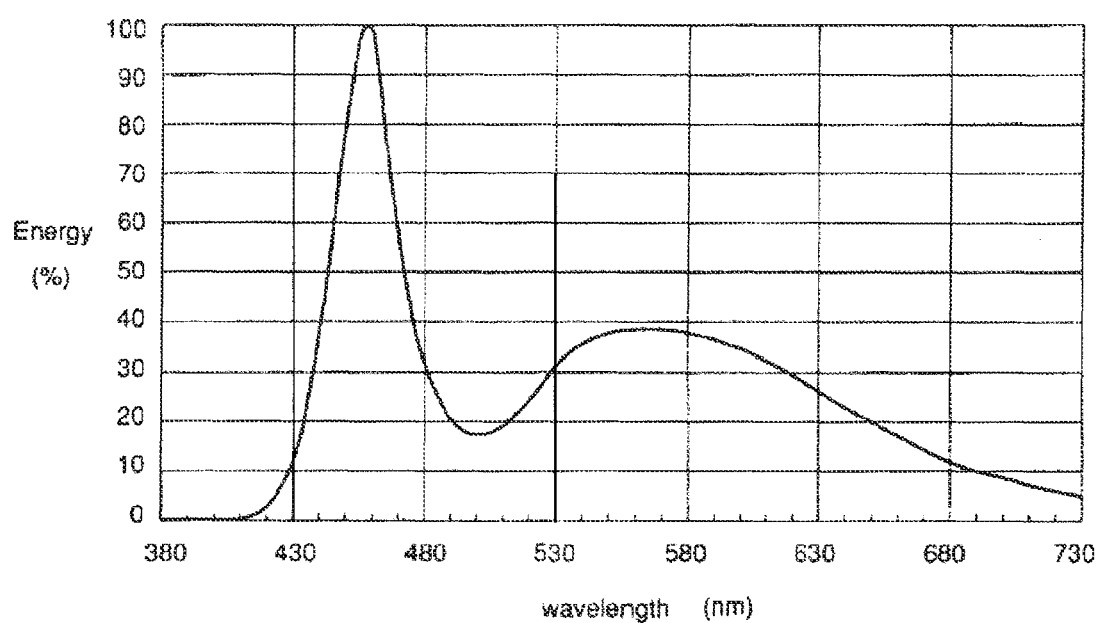
FIG. 1 shows a typical spectrum of light emitted by a white pcLED.

Reference will now be made in detail to the preferred embodiments of the invention. This invention may, however, be embodied in many different forms and should not be construed as limited to the embodiments set forth in the following description. The main features of an apparatus built in accordance with an embodiment of the present application can be better understood by referring to FIG. 2 which shows a dual-function lighting system 10 that provides standard illumination along with lidar capabilities for detecting remote obstacles or targets.

The lighting system 10 includes a light source 12 that emits visible and/or invisible light, in order to illuminate an environment according to its primary function. The light passes through the emission optics 14 before escaping from the lighting system 10. The emission optics 14 ensures that the light gets an angular radiation pattern suited for either general or application-dependent illumination purposes. The light source 12 then enables the system 10 to perform a first function, which consists in radiating illumination light, similarly to a standard incandescent light bulb.

This first major function must fulfill requirements that relate to parameters of the emitted light such as the radiated optical power and its angular radiation pattern, wavelength peak, its color temperature and color rendering, all of these requirements being to some extent application-dependent. In the illustrated embodiment of the lighting system 10, the light source 12 is formed of at least one solid-state lighting device such as a pcLED assembly, high power color or IR emitter, or an organic LED (OLED) assembly. The lighting system 10 can be integrated in/retrofitted to various high-end lighting apparatuses that could be, but are not limited to, car headlamps, flashlights, lighting fixtures, streetlights and infrared illuminator for night vision system.

A part of the light reflected/backscattered by an object 16 located at some distance within the field of illumination of the lighting system 10 falls on the entrance aperture of the collection optics 18. The collected light can be transmitted through an optical filter 20 and is then routed to the optical detector assembly 22. At least part of the collected light reaches the photosensitive surface of the optical detector assembly 22 if the object 16 lies within the field of view of the system 10. Using an optical filter 20 can improve the lighting system 10 to perform its second major function, i.e., the lidar function.

The usual role of the filter 20 is to block the ambient parasitic background light captured by the collection optics 18 while allowing the light emitted by the light source 12 and then returned from the remote object 16 to be detected by the optical detector assembly 22 with minimum loss. As mentioned earlier, the phosphor used in white pcLEDs converts a portion of the blue light emitted by the LED junction into broadband visible light.

Figure 3:
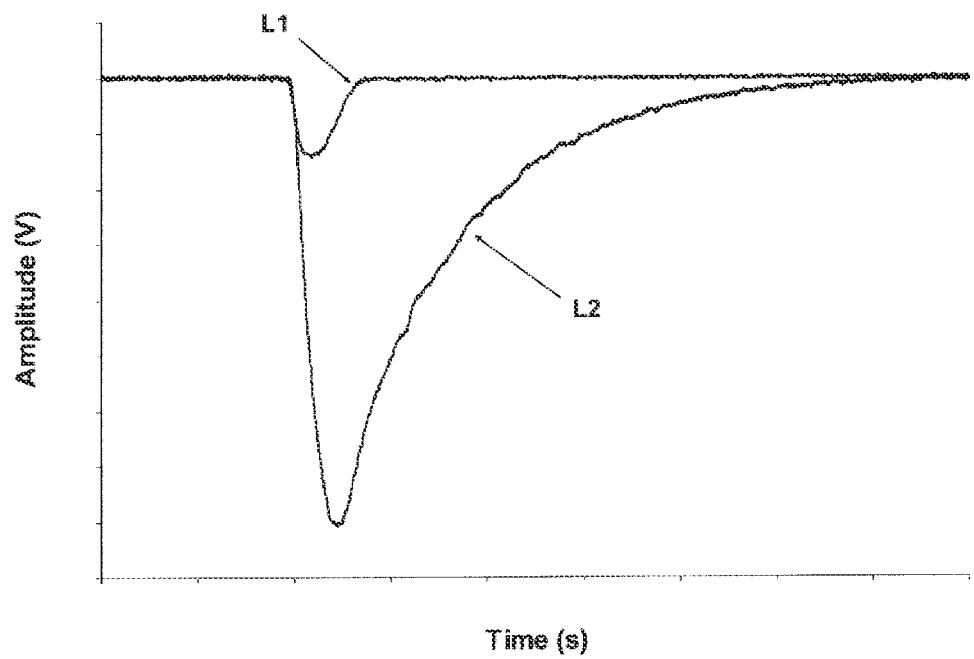
FIG. 3 is an amplitude-reversed graph illustrating the time-resolved intensities of the blue emission (L1) and total unfiltered emission (L2) from a high-brightness white pcLED driven by current pulses having duration of a few ns.

The curves shown in FIG. 3 are representative examples of time-resolved optical emissions from a pulsed white pcLED after the light was passed through a narrowband optical filter that transmits only the blue light (curve L1), and without any optical filter (curve L2). The curve L2 therefore corresponds to the full broadband light emission from the pcLED. It is seen that this full broadband emission decays at a much slower rate than the blue emission (curve L1). In addition, the contribution of the blue emission is found to be relatively weak as compared to the total light emission.

Spectrally-resolved luminescence decay curves of white pcLEDs (Model NSPW300BS from Nichia Corp., Tokushima, Japan) have been reported by T. Miyata et al., "Temporal emission characteristics of white light-emitting diodes for high-speed pulsed current" (*Proc. of the SPIE*, vol. 4829, pp. 718-719, 2003). The reported decay waveforms reveal that the decay time increases with the wavelength $\lambda$, reaching about 75 ns at $\lambda$=540 nm for pcLEDs driven with 15-ampere (A) current pulses of 5-ns duration. By comparison, the decay time is in the order of 15 ns at the 440-nm (blue) wavelength.

For optical-ranging applications requiring high accuracy or fine distance resolution when performed on targets of any color, it is considered to limit the emission spectrum of the pcLED used in the light source 12 by selecting for example either of the blue emission or the broadband luminescence emission. This selection does not require modifications to the pcLED assembly itself since it can be accomplished simply through appropriate optical filtering of the light incident on the optical detector assembly 22, using appropriate optical filters 20. The blue emission allows shorter light pulses well suited for optical ranging of targets located at short distance, while keeping the broadband luminescence emission for illumination purposes. In turn, for applications requiring the detection of distant targets with coarse distance resolution, the use of the luminescence emission from the pcLED can be more appropriate due to the higher optical energy carried by each light pulse. As a result, by using white pcLEDs as the light source 12 of the lighting system 10, the implementation of a narrowband blue-filter detection scheme combined with a lowpass-filtered luminescence detection scheme can enhance the lidar function by allowing measurements of short distances with fine resolution while providing higher sensitivity for detection of farther targets.

Figure 2:
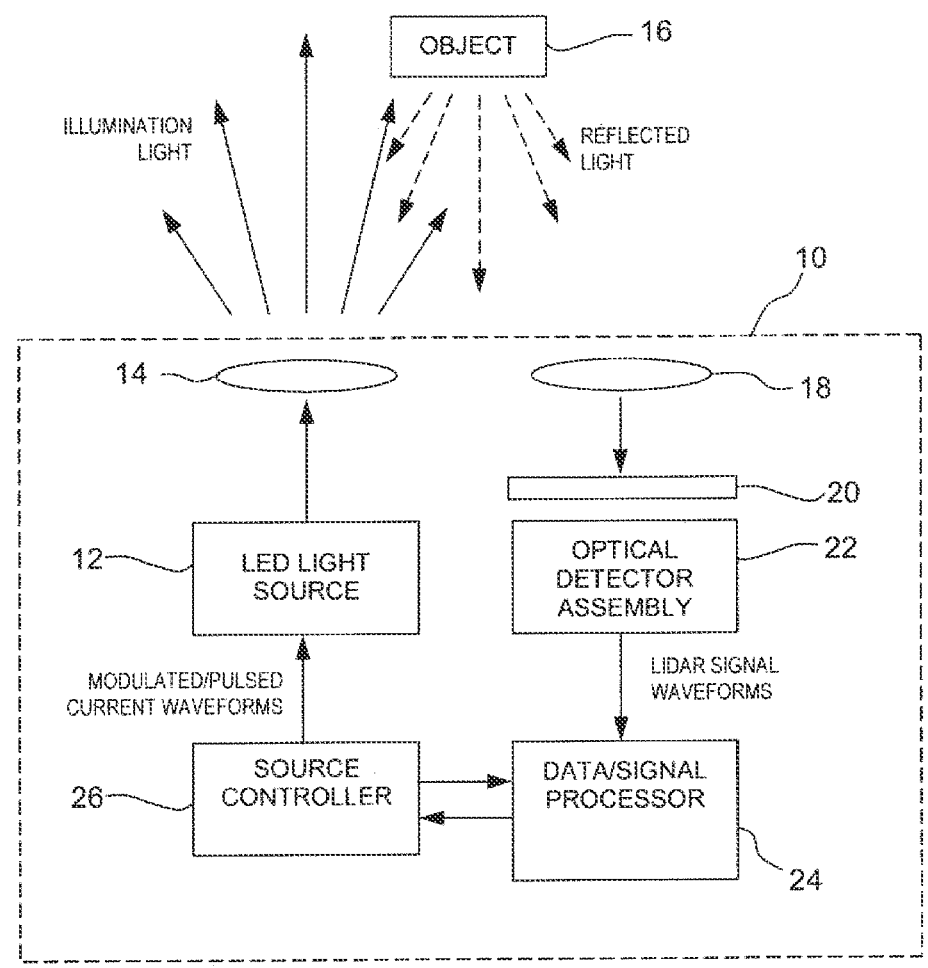
FIG. 2 is a schematic block diagram illustrating a dual-function lighting system in accordance with an embodiment of the present disclosure.

The optical detector assembly 22 comprises photodetection means connected to an electronic detection circuitry for proper filtering and conditioning (i.e., amplification) of the electrical signals. Neither photodetection means nor detection circuitry are shown in FIG. 2, but are part of the optical detector assembly 22. The photodetection means can be, but is not limited to a silicon photodiode, an avalanche photodiode (APD), or a photomultiplier tube (PMT).

As an alternative embodiment of the configuration discussed in the preceding lines, the use of optical filters 20 can be avoided by integrating in the optical detector assembly 22 photodetectors having their intrinsic responsivity optimized for either blue emission, luminescent emission from the pcLED or other specific wavelength (color or infrared). In this purpose, some photodetector assemblies provide two separate outputs from which the electrical signals related to the detection of both parts of the emission spectrum can be obtained.

Optical filters 20 can also be used to perform spectroscopic measurements at different wavelength bands within the broadband luminescent emission from white pcLEDs. Used in this way, the lidar function of the lighting system 10 can serve for remote optical detection of chemical species that display distinctive spectral features in the visible part of the electromagnetic spectrum. Likewise, the lidar function can be used for assessment of the spectrally-resolved optical backscattering properties of remote targets, either in the form of solid objects or in the form of aerosols.

Referring to the schematic diagram of FIG. 2, the lighting system 10 has a data/signal processor 24 that processes the electrical lidar signal waveforms sent by the optical detector assembly 22, according to the lidar function performed by the system 10. The data/signal processor 24 also commands the firing of the light source 12 via the source controller 26. As it will be explained in more details below, the primary function of the source controller 26 is to generate drive current waveforms with proper time-varying characteristics so that the lighting system 10 can perform both intended functions. These functions can be activated simultaneously or during distinct time intervals, depending on the requirements of the aimed application, the specific events that could occur, and the conditions that prevail at any moment in the surrounding environment.

LED drivers using switched-mode techniques have replaced linear current sources notably for their efficiency and control capabilities. For many applications, controlling the LED output intensity in real-time, commonly referred as dimming control, is an important requirement. The brightness of visible light from a LED or the output power of an IR LED is determined by the average forward LED current. The relation is relatively linear. Pulse-Width Modulation (PWM) dimming and analog dimming are common methods using a switched-mode driver circuit to control the intensity of a LED emission.

Generally, analog dimming uses a switch-mode driver with an inductor and a current sense resistor to regulate the current in the LED. The voltage in the current sense is compared with a set point to determine the duty cycle of the current pulses going through the inductance acting as a filter and supplying a constant current level to the LED. Analog dimming is often implemented for its simplicity and from an EMC/EMI perspective. However, the characteristics of the light emitted by the LED in terms of dominant wavelength and color temperature may drift in function of the drive current.

In the case of PWM dimming, the method uses a switch to supply a predetermined nominal current in the LED for certain periods of time ($t_{on}$) during a predetermined cycle of time ($t_{on}+t_{off}$). The dimming effect of the LED is proportional to the duty cycle (DC) of the waveform (DC=$t_{on}/(t_{on}+t_{off})$), and the average current is determined by the DC and the nominal LED current.

Figure 4:
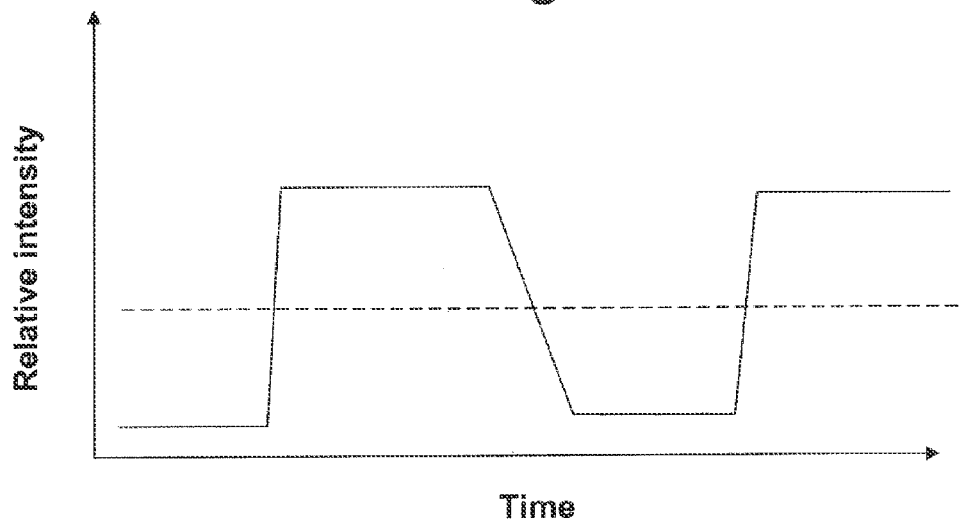
FIG. 4 is a diagram illustrating the output light intensity from a LED driven according to a pulse-width-modulation (PWM) scheme as compared to the corresponding light intensity from a LED driven with a DC current.
Figure 5:
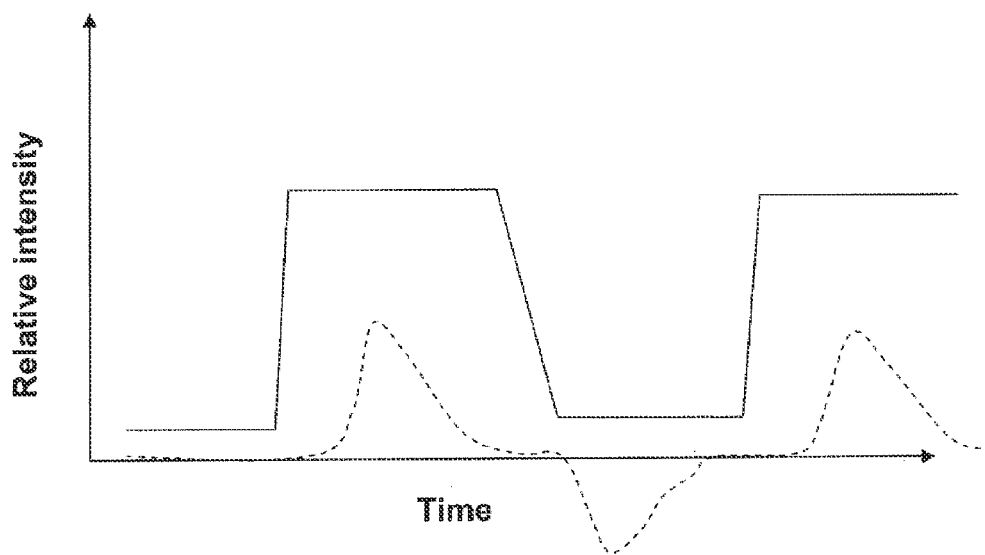
FIG. 5 is a diagram illustrating the output light intensity from a LED driven according to a PWM scheme with and the corresponding optical signal returned and processed from a remote target.

FIGS. 4 and 5 relate to an embodiment of the present application in which the fast risetime of the light emission from a LED can be used not only when driving the LED with short current pulses with duration of a few tens of ns, as it is of common practice in lidar instruments, but also when driving the LED according to a pulse-width-modulation (PWM) scheme.

More specifically, FIG. 4 is a diagram illustrating the output light intensity from a LED driven according to a pulse-width-modulation (PWM) scheme with a duty cycle of nearly 50% (solid curve), as compared to the corresponding light intensity from a LED driven with a DC current (dashed curve) adjusted to give the same average light output intensity.

FIG. 5 is a diagram illustrating the output light intensity from a LED driven according to a PWM scheme with a duty cycle of nearly 50% (solid curve), and the corresponding optical signal returned from a remote target and then detected by an optical detector with its detection circuitry operated in AC mode (dashed curve).

The pulse-width-modulation scheme is currently used to control the light output level (dimming) of illumination LEDs. In a standard PWM scheme, LEDs are driven by a periodic square-wave current waveform having fixed peak level and modulation frequency. The dimming of the LEDs is then achieved by varying the duration of the ON-state period of the modulation cycles. Stated otherwise, the dimming level varies linearly with the duty cycle of the drive current modulation waveform. As compared to the other popular dimming scheme for LEDs, i.e., the continuous current reduction (CCR), a PWM dimming scheme allows a broader control range of the dimming level (virtually from 0% to 100% of the maximum rated output power), while the emission color spectrum in the case of white pcLEDs and the dominant wavelength for a color/infrared LEDs remain nearly unchanged over the full dimming range.

The reduced chromaticity shift of white pcLEDs driven using a PWM dimming scheme has been reported by M. Dyble et al., "Impact of dimming white LEDs: Chromaticity shifts due to different dimming methods" (*Proc. of the SPIE*, vol. 5941, paper 59411H, 2005). An illumination device based on pcLEDs driven through PWM is disclosed in U.S. Pat. No. 6,028,694 to Schmidt. As compared to a similar device but driven with a constant current of the same average value as in the PWM, the light flux radiated by a solid-state illumination device is higher by taking advantage of the luminescent emission of pcLEDs that persists during a certain time (afterglow) after each current pulse has ceased.

Figure 8:
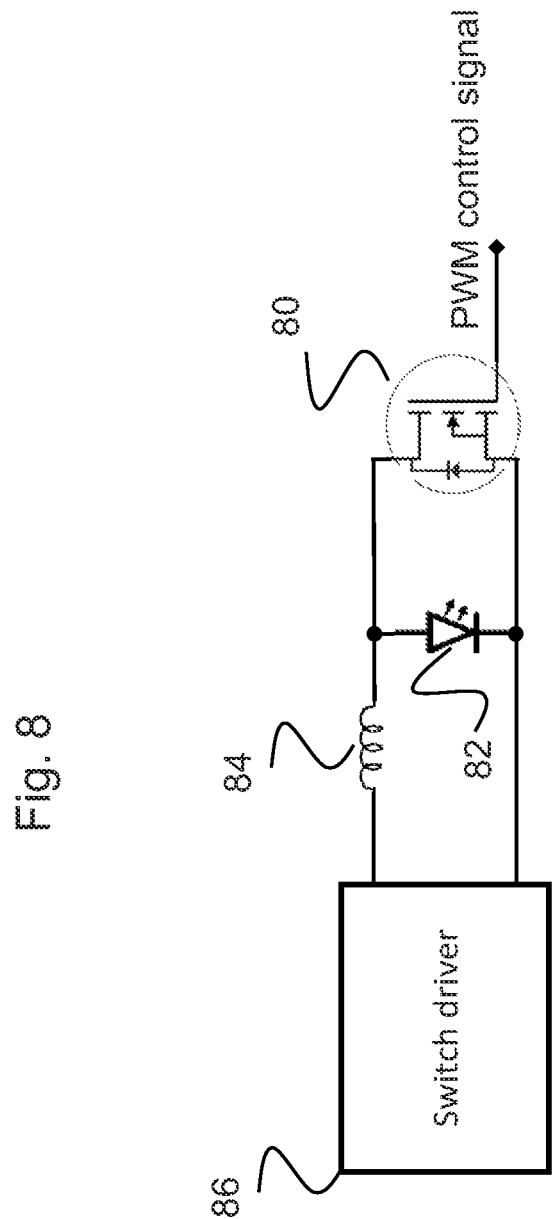
FIG. 8 shows a schematic block diagram of an embodiment to improve the slew rate of PWM pulses.

In the lidar function realized with the lighting system 10, the risetime and falltime of the emission from LEDs is used to get distance measurements with enhanced resolution if the temporal shape of the long optical pulses, having durations usually in the range of a few microseconds to tens or hundreds of microseconds, exhibits steep leading and falling edges. By steep edges, it is meant that the transitions are completed in a time in the order of a few ns or a few tens of ns. In basic switch-mode driver, the LED current rise and fall time is mainly limited by the slew rate of the inductor and the characteristic of the switch-mode driver. A slew rate of 1 µs and higher is common and has an impact on the dimming performance and also on the lidar function. Using techniques to enhance PWM dimming logic like external parallel switch PWM dimming by shorting LED+ to LED− and by providing continuous current to the output through the inductor during the transition, this may increase the performance of the slew rate and may allow a higher dimming frequency and higher detection performance from the lidar function. FIG. 8 shows an embodiment of this principle that provides a switching shunt path for the continuous output current bypassing the light source. In FIG. 8, when the MOSFET 80 is turned on, LED 82 (or LEDs string) is shorted and the current in inductor 84 is redirected from LED 82 to the MOSFET 80. The switch driver 86 provides a continuous current through the inductor 84 and the current rise time and fall time in LED 82 will no longer depend on the frequency of the internal regulation of the switch driver 86 and the slew rate of the inductance, but will be determined by the characteristic of the MOSFET 80. The duty cycle is determined by the PWM control signal.

Another technique uses a capacitor large enough to absorb and store the energy from the inductance when disconnecting the LED load. The energy stored in this capacitor will be used at the next pulse generating a high slew rate.

The detection circuitry of the optical detector assembly 22 is then operated in AC mode to retain only the target distance information retrieved from the rapid transients (leading and/or falling edges) in the captured light signals. Of course, this method is not as efficient as the common use of ns-duration high-peak-power optical pulses in traditional lidar systems, but nevertheless the method of the present application could be very useful in performing lidar functions with targets located at short range, i.e., from a few meters to a few hundred meters.

FIG. 5 illustrates another embodiment of the application in which the shorter risetime (as compared to the falltime) from a LED is used to measure the distance to a remote target in the same manner as described above. In this embodiment, only the leading edge of the signal waveform at the output of the detection circuitry operating in AC mode is processed to determine the distance to the target. According to the time-of-flight principle, this distance is inferred from the time delay that separates the leading edge of a modulation cycle of the light emitted from the lighting system 10 (solid line) from the corresponding leading edge of the light signal captured after its reflection off the remote target (dashed line). This time delay comes from the finite velocity at which the light pulses propagate during their double travel between the lighting system 10 and the object 16 on which they are reflected.

Figure 6:
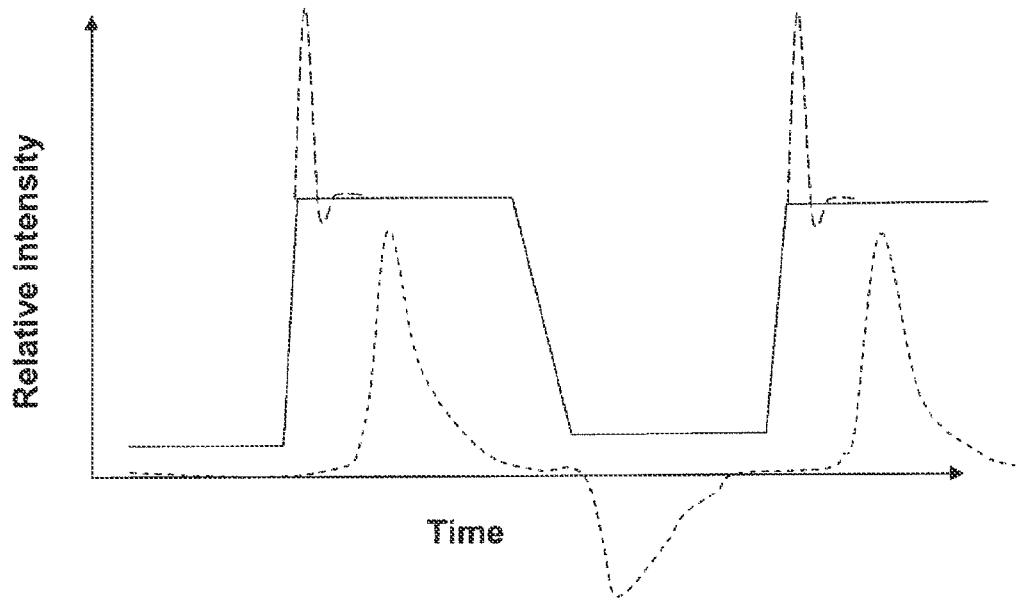
FIG. 6 is a diagram illustrating the output light intensity from a LED driven by a periodic current waveform in one embodiment.

Another embodiment is illustrated in FIG. 6, in which a diagram illustrates the output light intensity from a LED driven by a periodic current waveform that results from the combination of a PWM scheme adjusted to a duty cycle of nearly 50% (solid curve) with a repetitive train of short-duration high-peak-power pulses (long dashed curves) emitted in perfect coincidence with the leading edges of the modulation cycles. These pulses are rapid transients that will be identified by the lighting system 10. The short-dashed curve represents the corresponding optical signal returned from a remote target and then detected by an optical detector with its detection circuitry operated in AC mode.

In the embodiment of FIG. 6, a short but intense drive current burst is superimposed on the leading edge of each modulation cycle of a PWM dimming scheme. The current burst is depicted by the long-dashed line in FIG. 6, and its duration is very short as compared to the duration of the ON state of each modulation cycle. Similarly to the principle of the previous embodiment, only the leading edge of the signal waveform at the output of the detection circuitry of the optical detector assembly 22 is processed to determine the distance to the target.

Figure 7:
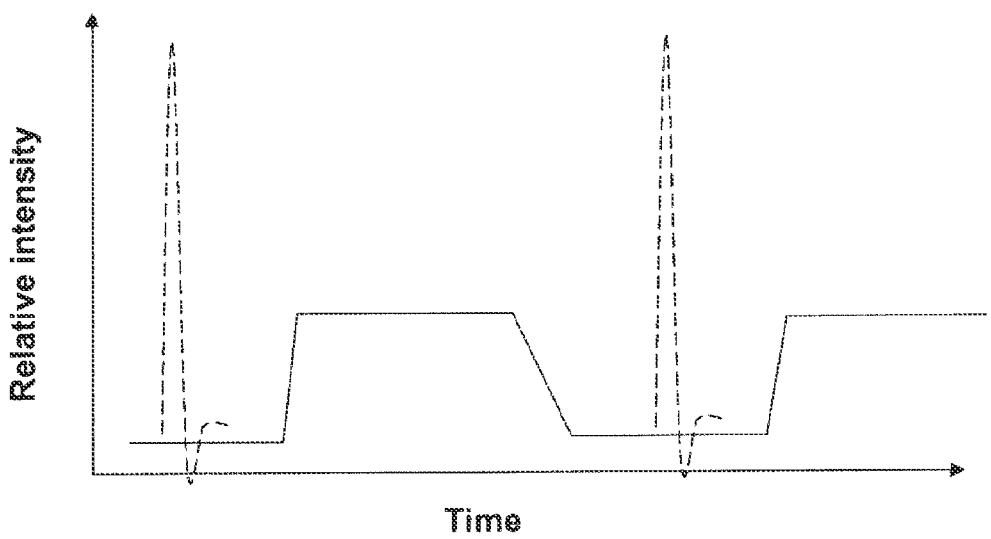
FIG. 7 is a diagram illustrating the output light intensity from a LED driven by a periodic current waveform in another embodiment.

FIG. 7 schematically illustrates the principle of another preferred embodiment of the application, in which the output light intensity from a LED driven by a periodic current waveform results from the combination of a PWM scheme having a duty cycle of nearly 50% (solid curve) as illustrated with a repetitive train of short-duration high-peak-power pulses (dashed curves). Each individual optical pulse (i.e., rapid transient) is emitted only during the OFF state of a modulation cycle.

In this embodiment, at least one short-duration intense current pulse is generated at a given moment during the OFF-state period of each modulation cycle of a PWM dimming scheme. The short pulses of light radiated by the LEDs serve for the lidar function of the lighting system 10. The emission of short pulses of light will not normally have an impact on the illumination function of the lighting system 10 because the optical energy carried by each individual short pulse is quite small as compared to the energy radiated during each complete modulation cycle of the PWM scheme. More precisely, the impact of the short-pulse emission would be negligible as long as the illumination function does not command a strong dimming of the LED through the setting of a very low duty cycle for the PWM scheme.

The embodiment of the application in which the LED emission is as depicted in FIG. 7 can be imagined as a lighting system 10 that performs an illumination function during each ON-state period of the PWM scheme and a lidar function during each OFF-state period. As a result, the lighting system 10 periodically switches between both major functions at a rate given by the frequency of the PWM scheme.

The performance of the lighting system 10, in realizing its lidar function according to the principle depicted in FIG. 7, can be enhanced by allowing the LED to emit a train of short optical pulses during each OFF-state period of the PWM scheme. The possibility of emitting several short optical pulses arises from the fact that the modulation frequency of the PWM scheme need not be very high, since modulation frequencies in the range of a few hundred Hz fit well with most lighting applications. It is known that a modulation frequency as low as 200 Hz avoids any flickering effect resulting from the perception of each individual modulation cycle by a viewer.

Assuming for example that the lidar function would be limited to the detection and ranging of targets located at a maximum distance of 100 m, this means that the short optical pulses could be emitted with a minimum delay of 0.67 µs between consecutive pulses to avoid any range ambiguity in the detection of the return optical signals. This delay is equivalent to an 1.5-MHz pulse repetition rate. Setting the frequency of the PWM scheme at 200 Hz, as discussed above, gives a minimum duration of 2.5 ms for the OFF-state period of each modulation cycle. This minimum 2.5-ms OFF-state period assumes that the duty cycle of the PWM scheme cannot exceed 50%. During each 2.5-ms period, more than 3700 short optical pulses can be emitted at a repetition rate of 1.5 MHz and subsequently detected to perform the lidar function. The individual lidar signal waveforms that have been captured during the 2.5-ms period can be summed and then averaged to give a resulting lidar waveform having a signal-to-noise ratio enhanced by a factor up of more than 60 ($3700^{1/2}$), thus resulting in a higher sensitivity for the lidar measurements.

The emission of a large amount of short, but intense, optical pulses during each OFF-state period of a PWM scheme could affect the illumination function of the lighting system 10 by noticeably increasing the illumination power level for a fixed duty cycle. Fortunately, the duty cycle of the PWM scheme could be temporarily reduced to compensate for the optical energy radiated by the train of short optical pulses if it is desired to activate the lidar function without any change in the illumination power level. Returning back to the example discussed previously, the lidar function may be performed by sending a train of 3700 optical pulses during each 2.5-ms long OFF-state period, with each optical pulse having duration of 15 ns and peak power ten times higher than the peak power of each ON-state period of the PWM scheme. The total (lidar) energy radiated by the pulse train then represents approximately 22% of the (illumination) energy radiated during each ON-state period. This means that the output of the lighting system 10 would be perceived as about 22% brighter during the periods where the system also acts as a lidar. In this specific example, a constant illumination level could be obtained simply by dynamically reducing the duty cycle of the PWM scheme from 50% to 38.9% during the moments the lidar function is enabled.

An active night vision system is a good example of an application using low duty cycle PWM and where the emission of a train of short optical pulses during each OFF-state is appropriate. The duty cycle for this application is often less than 10°, allowing the use of the same infrared LED source for the illumination of an IR camera and for lidar functionalities. Active night vision is used notably in automotive applications, to increase a vehicle driver's perception, in security and in transportation applications, for instance to perform license plate recognition.

Figure 9:
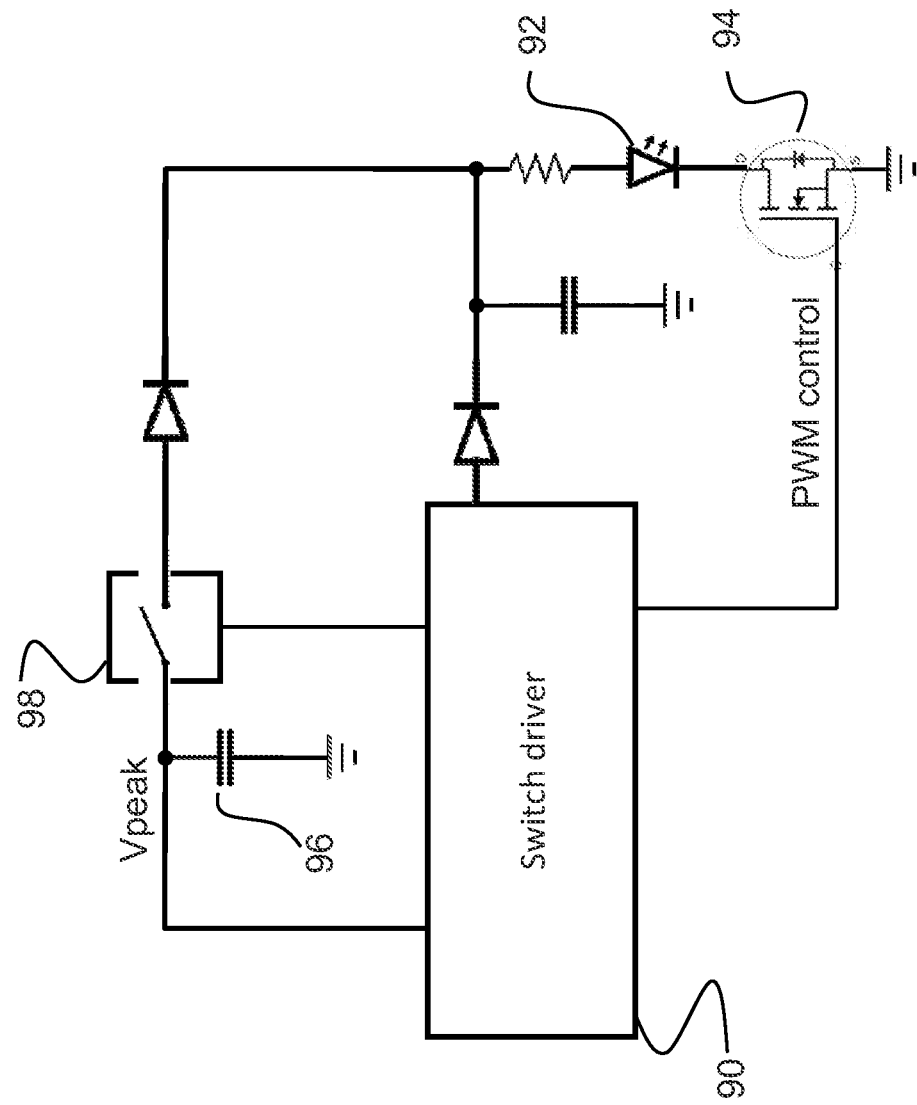
FIG. 9 shows a schematic block diagram of an embodiment generating rapid transient pulses.

FIG. 9 shows a schematic of an embodiment generating rapid transient pulses as shown in FIG. 6 and FIG. 7. Switch driver 90 supplies the nominal current to the LED 92 for illumination purposes and controls the duty cycle of the PWM by switching the MOSFET 94. Switch driver 90 also controls the voltage Vpeak in the capacitor 96 (typically a bank of capacitors) and the timing of the switch 98. Vpeak is at a higher voltage than the voltage on the anode of the LED 90 at nominal current value. When a rapid transient pulse is required, the switch driver turns on the switch 98 and the energy stored in the capacitor 96 is discharged to the LED 92, generating a high current pulse with very short width. The switch 98 is then turned off. High current pulses can be generated at different moments of the PWM cycle (i.e., during the on-state, off-state and transition).

While the preferred embodiments of the invention in their various aspects have been described above, such descriptions are to be taken as illustrative of embodiments of the invention rather than descriptions of the intended scope of the invention, which scope is more fully appreciated by reference to the disclosure as a whole and to the claims that follow.

The invention claimed is:

1. A method for detecting an object using light, comprising:
    obtaining a light source having a function of illuminating an environment, the light source comprising at least one light-emitting diode;
    driving the light source to emit light in a pulse-width modulation of variable duty cycle intended for standard illumination, such that the light source maintains said function of illuminating an environment;
    receiving a reflection or backscatter of the emitted light from an object;
    identifying rapid transients in the reflection or backscatter received; and calculating a distance of the object from the rapid transients received and rapid transients from the pulse-width modulation.

2. The method according to claim 1, wherein:
driving the light source to emit light in a pulse-width modulation comprises emitting pulses;
identifying rapid transients comprises identifying the pulses in the reflection or backscatter received; and
calculating a distance comprises calculating from the pulses from the pulse-width modulation.

3. The method according to claim 2, wherein emitting pulses comprises superimposing a pulse of short duration to a leading edge of each cycle of the pulse-width modulation.

4. The method according to claim 2, wherein emitting pulses comprises inserting at least one pulse of short duration in an off-state period of each cycle of the pulse-width modulation.

5. The method according to claim 1, wherein:
identifying rapid transients in the reflection or backscatter received comprises identifying leading edges of the reflection or backscatter received; and
calculating a distance comprises calculating from leading edges of the pulse-width modulation.

6. The method according to claim 1, wherein:
identifying rapid transients in the reflection or backscatter received comprises identifying leading edges and falling edges of the reflection or backscatter received; and
calculating a distance comprises calculating from leading edges and falling edges of the pulse-width modulation.

7. The method according to claim 2, wherein emitting pulses comprises inserting at least one pulse of short duration in an on-state period of each cycle of the pulse-width modulation.

8. The method according to claim 1, wherein driving the light source comprises providing a switching shunt path for the continuous output current to bypass the light source.

9. The method according to claim 1, wherein driving the light source comprises temporarily storing energy and subsequently discharging the energy to the light source to generate a pulse of short duration.

10. The method according to claim 1, wherein obtaining the light source comprises obtaining at least one phosphor-converted light-emitting diode.

* * * * *